United States Patent [19]

Ellis et al.

[11] Patent Number: 5,155,471
[45] Date of Patent: Oct. 13, 1992

[54] LOW PRESSURE BURST DISK SENSOR WITH WEAKENED CONDUCTIVE STRIPS

[75] Inventors: Jim E. Ellis, Tulsa; John A. Tomasko, Claremore; Mitchel L. Rooker, Sand Springs, all of Okla.

[73] Assignee: BS&B Safety Systems, Inc., Tulsa, Okla.

[21] Appl. No.: 718,801

[22] Filed: Jun. 21, 1991

[51] Int. Cl.⁵ .................................. G08B 21/00
[52] U.S. Cl. ......................... 340/611; 340/626; 137/68.1; 137/557; 200/61.08; 116/266
[58] Field of Search ............ 340/603, 611, 626; 137/68.1, 557; 200/61.08; 116/266, 272, 273

[56] References Cited

U.S. PATENT DOCUMENTS

| | | | |
|---|---|---|---|
| 3,770,918 | 11/1973 | Fortmann | 200/61.08 |
| 4,342,988 | 8/1982 | Thompson et al. | 340/679 |
| 4,408,194 | 10/1983 | Thompson | 340/626 |
| 4,978,947 | 12/1990 | Finnegan | 340/611 |

Primary Examiner—Jin F. Ng
Assistant Examiner—Jeffery A. Hofsass
Attorney, Agent, or Firm—Laney, Dougherty, Hessin & Beavers

[57] ABSTRACT

An ultra low pressure flow sensor consisting of a support gasket defining a flow way and having a thin, pliable membrane extending thereacross with right angle slits formed totally across the flow way portion. An electrical conductor strip is then bonded across each pair of opposing quadrants of the membrane in continuous connection to an electrical indicator circuit. The conductor strip across each pair of membranes is centrally notched to a preselected depth of cut thereby to adjust the flow pressure break strength.

10 Claims, 2 Drawing Sheets

LOW PRESSURE BURST DISK SENSOR WITH WEAKENED CONDUCTIVE STRIPS

BACKGROUND OF THE INVENTION

1. Field of the Invention

The invention relates generally to rupturable fluid flow indicators and, more particularly, but not by way of limitation, it relates to an improved form of burst disk sensor for ultra low pressure applications wherein the burst strength of the sensing membrane is removed from the equation and only the strength of the conductor is in contention thereby to provide an electrical indication at a preselected break strength point.

2. Description of the Prior Art

Safety pressure relief apparatus of the rupturable type has often been utilized in applications where continual indication of the operating condition of the apparatus is desirable or necessary. Fluid pressure rupturable apparatus generally includes one or more rupture disks sealingly clamped between annular supporting members or heads which are then bolted together or suitably clamped between bolted flanges in a conduit or flow line. Thus, when a rupture disk fails, an indication of the failure may not be given other than by the resulting change in the vessel or flow line pressure. In some situations, the pressure condition of the system may not change appreciably and the failure of a rupture disk could go unnoticed for a considerable period of time.

Rupture disk monitoring devices and rupture disk alarm systems have been developed and utilized heretofore. For example, U.S. Pat. No. 3,770,918 is directed to a monitoring device for a reversible rupture disk that includes electric probes positioned behind the rupture disk. U.S. Pat. No. 4,342,988 is directed to a rupture disk alarm system that includes a signal carrying means in contacting relationship with a rupture disk. U.S. Pat. No. 4,408,194 is directed to a rupture disk monitor apparatus that includes capacitor means positioned in sensing relationship to a rupture disk. U.S. Pat. No. 4,978,947 is directed to a rupturable fluid flow indicator that includes a rupturable member having a plurality of openings formed therein and an electric current conductor attached to said rupturable member.

While the prior art rupture disk monitoring devices and systems have achieved varying degrees of success, they generally are not suitable or reliable in high temperature and/or highly corrosive applications, and they do not operate consistently unless full opening of the rupture disk occurs. Specifically, it is a problem to obtain a reliable break limit as well as an indication of rupture disk failure in very low flow pressure situations. Accordingly, the present invention provides an improved rupturable fluid flow indicator for use in ultra low flow pressure applications.

SUMMARY OF THE INVENTION

The present invention relates to an improved burst disk sensor that is operable in very low pressure systems. The burst disk sensor may be employed in such as a relief flow line adjacent a low pressure rupturable disk or the like which is clamped, normally upstream of the sensor, across the flow line by means of inlet and outlet head members. The sensor consists of a basic frame or gasket member defining the related flow way which can also be clamped between the inlet and outlet head members. The gasket carries a very thin membrane of plastic film thereon having the flow way portion slit to provide flexible petals. The petals are maintained closed across the flow way by means of one or more conductors bonded thereon and continuous thereacross, each of such conductors having a point of minimum break strength located centrally of the flow way cross section. Thus, the resistance of the membrane is eliminated from the break strength equation as only the conductor minimum break point senses the flow of fluid and consequent flow pressure presence, e.g., as a result of the upstream rupture of a rupture disk. Electrical indication and/or alarm may then be actuated in response to the conductor breakage or open circuit.

Therefore, it is an object of the present invention to provide a reliable ultra low pressure burst disk sensor.

It is also an object of the present invention to provide a burst disk sensor for use at extremely low pressures that functions without affecting the performance or full opening of an associated rupture disk.

It is still another object of the present invention to provide a burst disk sensor that will open reliable and provide indication at flow pressures as low as 0.05 pounds per square inch differential.

Finally, it is an object of the present invention to provide a flow activated burst disk sensor that is effective for sensing ultra low flow pressure to give a positive electrical indication.

Other objects and advantages of the invention will be evident from the following detailed description when read in conjunction with the accompanying drawings which illustrate the invention.

DETAILED DESCRIPTION OF THE INVENTION

Figure 1:
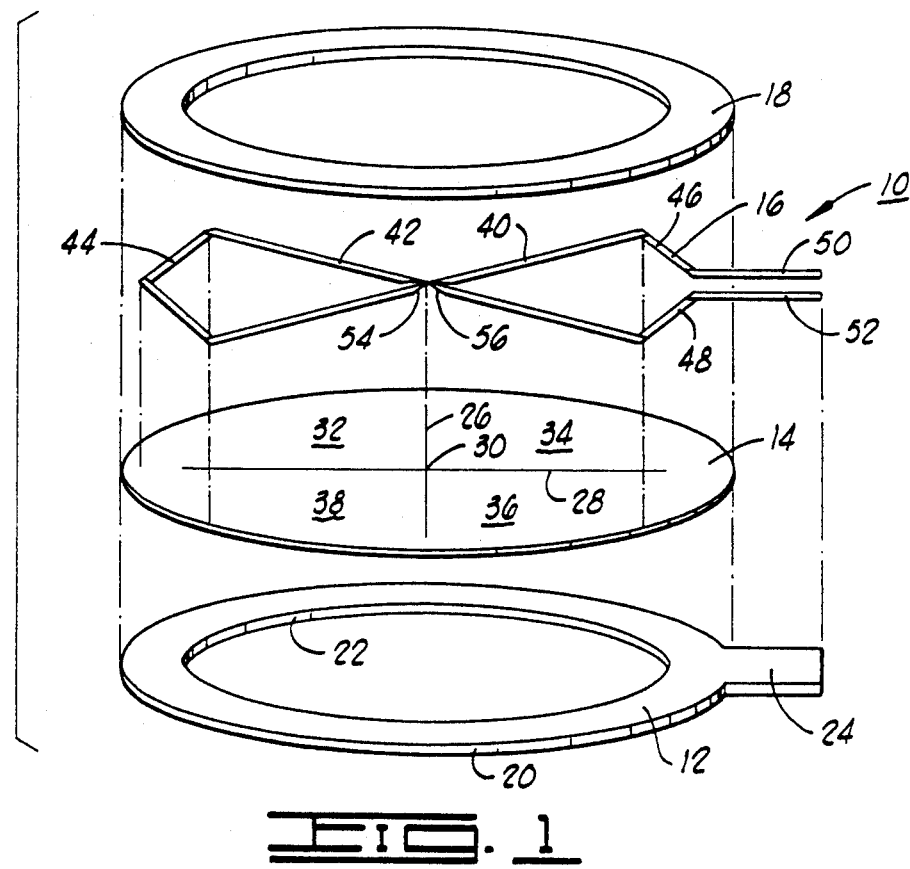
FIG. 1 is an exploded view in perspective of the burst disk sensor with upper gasket.
Figure 2:
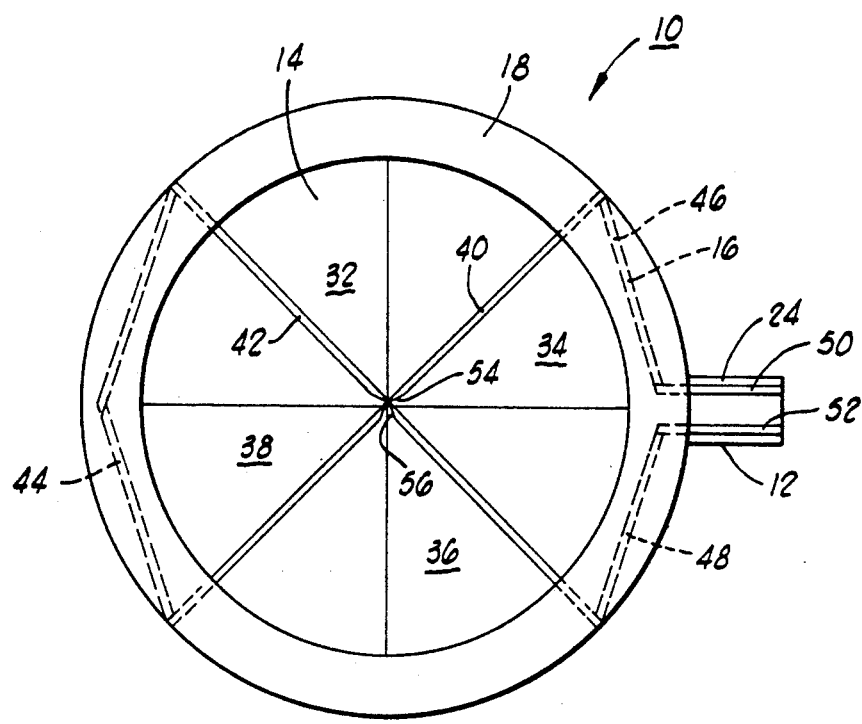
FIG. 2 is a top plan view of the burst disk sensor of FIG. 1 in assembled form.

Referring to FIGS. 1 and 2, an ultra low pressure burst disk sensor 10 consists of a support gasket 12, a plastic membrane 14 and a conductor strip 16 bonded thereon. A second or sealing gasket 18 is then employed in overlay in most applications; however, the upper gasket 18 is entirely for sealing purposes and contributes nothing to the burst disk sensor operation.

The support gasket 12 has an outer circumference 20 and an inner circumference 22, the diameter of the inner circumference 22 generally conforms to the diameter of the conduit flow way wherein the sensor 12 will be seated. Gasket 12 is formed of a suitable gasket material on the order of 3/16ths inch thickness and it includes a radially aligned rectangular tab 24 which serves to support a coupling element, as will be further described below. The support gasket 12 may be formed from any number of electrically insulative gasket materials.

The membrane 14 is formed of a suitable plastic film of selected thickness consonant with stiffness requirements, e.g., 0.003 inches film. Any of various plastic materials may be used so long as they are resistant to high temperature deformation or deterioration and are corrosion resistant. Preferred materials are those selected from the group consisting of polyesters, polyamides, polyolefins, and the like. The membrane 14 includes crossed, 90° slits 26 and 28, each of which extends across the internal flow way area or internal diameter 22 of support gasket 12. The slits 26 and 28 cross at center point 30 to define four quadrature arrayed petals 32, 34, 36 and 38 which are free and independently flappable.

Stiffening for pressure interference of the petals 32–38 is then provided by the conductor strip 16 which is bonded to membrane 14 in a generally figure eight configuration. The conductor strip 16 is arrayed in two crossed conductor strip portions 40 and 42 with a folded interconnection 44 on one rim of membrane 14 while leading conductor strip portions 46 and 48 outward to form contactor strips 50 and 52 as bonded onto support gasket tab 24. The cross strip portions 40 and 42 are each formed with a respective central notch 54 and 56, the depth of which determines the specified break strength for the burst disk sensor. The notches 54 and 56 are aligned over the center point 30 of membrane 14, and the conductor strip 16 is selected to be a conductive metallic material of sufficient thickness to maintain petals 32–38 rigid in low pressure blockage of the flow way, yet thin enough that it can be selectively notched for very low flow pressure breakage. Such metallic strip material may be selected from the group consisting of silver, nickel, chromium, iron, copper and alloys, and a preferred material is a foil strip of nickel-chromium alloy known commercially as INCONEL TM.

Figure 3:
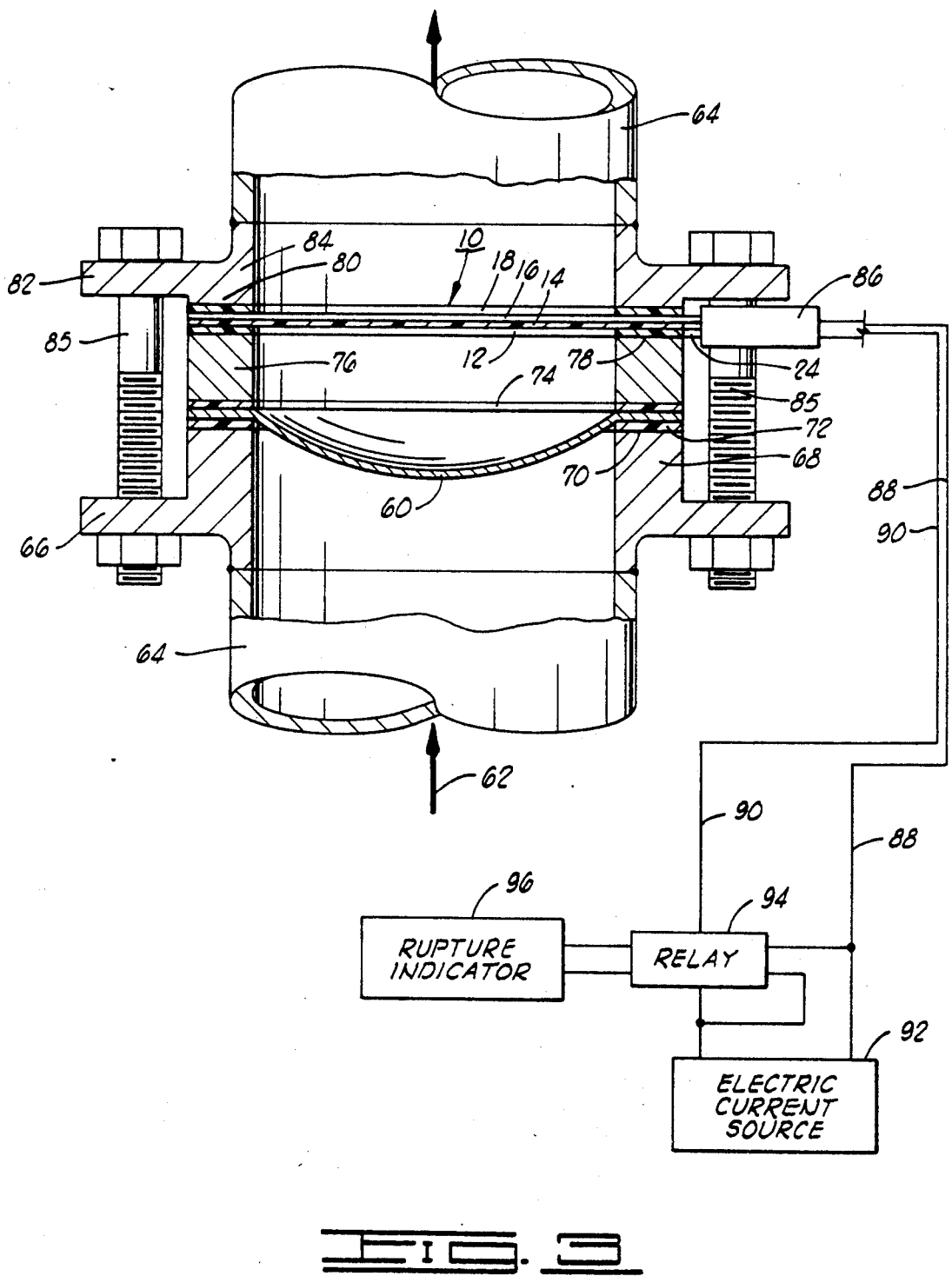
FIG. 3 is a view of the burst disk sensor in section as installed in a flow way shown in cutaway with block diagram representation of indicator circuitry.

Referring to FIG. 3 the burst disk sensor 10 may be employed downstream from a rupturable disk 60 of predetermined safety pressure relief. The rupture disk 60 may be a type which opens at pressures as low as 1.5 inches water column, i.e., 0.05 pounds per square inch differential. Thus, the rupture disk 60 will open fully when subjected to the proper burst pressure albeit a very low pressure, and the low pressure burst disk sensor 10 will fail at the conductor strip notches, either one or both notches 54 and 56, to provide output indication.

Fluid pressure is directed as shown by the arrow 62 through conduit 64. The conduit 64 is connected to a clampable flange member 66 which forms an inlet head 68 that provides an annular seating surface 70 for receiving an inlet gasket 72, the rupture disk 60 and an outlet gasket 74. A separator ring 76 is then seated on gasket 74 to provide an annular face 78 for receiving the burst disk sensor 10.

The disk sensor 10 is positioned with support gasket 12 adjacent annular face 78 and supporting the membrane 14 with conductor strips 16 and overlay gasket 18 adjacent an annular face 80 of an outlet flange 82 that forms an outlet head 84 in continued connection to conduit 64. A plurality of bolts 85 in circumferential spacing secure flanges 82 and 66.

A suitable connector 86 connects to the tab 12 and contactor strips 50 and 52 to provide electrical connection via leads 88 and 90 to the alarm and indicator circuitry. Thus, lead 88 is connected to an electric current source 92 as well as through a relay 94 to a suitable rupture indicator 96. The electric current source 92 is returned through relay 94 to provide holding current for continuing rupture indication.

In operation, the burst disk sensor 10 responds to a failure of rupture disk 60 to provide an indication when either or both of conductor strips portions 40 and 42 are broken or opened electrically. Since the conductor strip portions 40 and 42 are securely bonded to the membrane petals 32, 34, 36 and 38, the full fluid flow force or pressure from the total area within the flow way is applied to the conductor strip 16. No resistance can be attributed to the membrane 14 since it is cross-slit across the entire flow way. The notches 54 and 56 in respective conductor strip portions 40 and 42 are pre-cut to a depth adjusting the break strength of the respective conductor strips thereby to select a breakpoint requiring very little fluid flow pressure. In this way, an ultra low burst disk sensor is provided, one which operates reliably and opens as low as 0.05 PSIG.

It also contemplated that the similar principles be utilized with a strip type burst disk sensor. That is, a membrane or plastic film strip may be extended across a flow way while being slit at a central point. A conductor strip bonded on the film strip, i.e., one or more notched conductor strips, maintains the strip in position transverse of the flow way until venting of sufficient process fluid to exceed the conductor break strength. In effect, the insulative membrane and the conductor strip work in concert to form a composite rupture membrane as the conductor strip itself actually becomes a part of the rupture member.

The foregoing discloses a novel form of burst disk sensor that has the capability of providing indication of disk failures at ultra low system pressures. The particular type of sensor is of great benefit in low pressure applications wherein the operation does not enjoy the destructive benefits of a sonic shock wave at the instant of rupture, and gentle flow pressures can be sensed to cause a gauged breakage for the purpose of providing an alarm or other visual indication. The device is relatively simple and reliable and can be constructed of an umber of different configurations, plastic films, conductive strip materials and the like.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. A device for sensing flow in a very low pressure flow line, comprising:
    an insulative support member defining a central flow way adapted to be seated between inlet and outlet head means which define a central flow way and are in sealed retention in alignment with said flow line;
    an insulative membrane supported on said support member and extending across said central flow way and having at least one slit formed through the central flow way such that at least two membrane petals normally extend across the central flow way;
    flexible strip means of electrical conductor bonded across the membrane petals and having a weakened portion with predetermined break strength disposed over the at least one slit, the conductor having first and second ends; and
    means connected to the conductor first and second ends for providing indication when the conductor is broken.

2. A device as set forth in claim 1 wherein said insulative membrane is further characterized in that:
    said insulative membrane has two 90° oriented slits formed through the central flow way thereby to form a quadrature array of membrane petals.

3. A device as set forth in claim 2 wherein:
    said flexible strip means of conductor is bonded to each of opposing pairs of the quadrature array of membrane petals to form a crossed pattern of conductors, and each conductor having a weakened portion which overlies the respective two slits formed across said membrane.

4. A device as set forth in claim 3 which is further characterized in that the said device is disposed downstream from a low pressure responsive rupture disk.

5. A device as set forth in claim 1 which is further characterized to include:
   a gasket means defining said central flow way and being secured between the insulative membrane and said outlet head.

6. A device as set forth in claim 3 which is further characterized to include:
   a gasket means defining said central flow way and being secured between the insulative membrane and said outlet head.

7. A burst disk sensor for use in a flow line that is protected from an over pressure condition by a rupture disk, comprising:
   an inlet and an outlet head each defining a central flow way and being sealingly contained in the flow line;
   a gasket defining a central flow way and including a flexible membrane extending thereacross disposed between said inlet and outlet heads, said membrane having at least one slit across the flow way portion that divides the membrane into plural flexible petals;
   conductor means secured on the gasket membrane and bisecting the flow way while being in bonded relationship to each of said flexible, petals, said conductor means having a weakened portion with preselected break strength at the center point of said flow way disposed over the at least one slit; and
   whereby flow line flow pressure exceeding the preselected break-strength limit will cause opening of the conductor means.

8. A burst disk sensor as set forth in claim 7 which is further characterized in that:
   said flexible membrane is slit into four quadrature arrayed petals and said conducting means extends in the form of first and second strips across said flow way in 90° relationship, each strip being bonded to respective oppositely disposed pairs of flexible petals.

9. A burst disk sensor as set forth in claim 7 which is further characterized to include:
   a second gasket means defining a central flow way, and being disposed between the gasket including flexible membrane and the outlet head.

10. A burst disk sensor as set forth in claim 7 which is further characterized in that:
    each of said first and second strips includes a point of preselected minimum break strength which points overlie one another generally centrally of said flow way.

* * * * *